Aug. 2, 1949.   G. H. KAEMMERLING   2,478,108
RESILIENT MOUNTING
Filed Nov. 3, 1944   2 Sheets-Sheet 1

Inventor
Gustav H Kaemmerling
By Ralph Hammar
Attorney

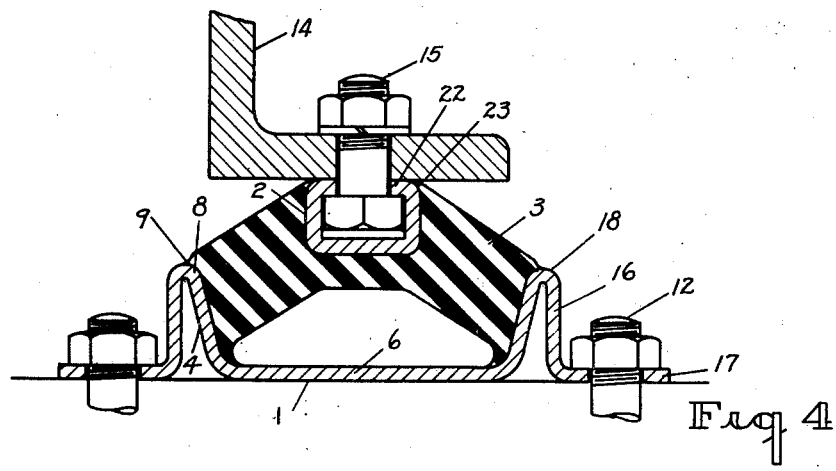
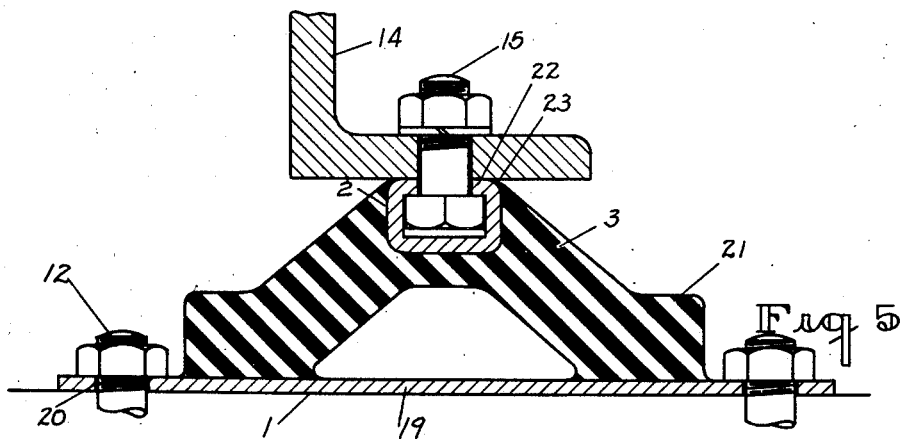

Patented Aug. 2, 1949

2,478,108

UNITED STATES PATENT OFFICE 2,478,108

RESILIENT MOUNTING

Gustav H. Kaemmerling, Erie, Pa., assignor to Lord Manufacturing Company, Erie, Pa., a corporation of Pennsylvania Application November 3, 1944, Serial No. 561,646

11 Claims. (Cl. 248—24)

The present invention relates to resilient mountings having supporting and supported members of strip form bridged by rubber. The mountings may be made of standard cross section and the length varied to accommodate the load. The metal strips are shaped to present readily accessible attaching surfaces and the rubber bridging member is designed to prevent localized stress. Further objects and advantages appear in the specification and claims.

Figure 1:
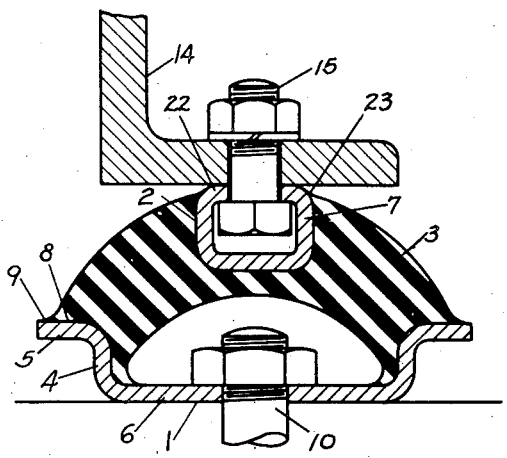
Figure 2:
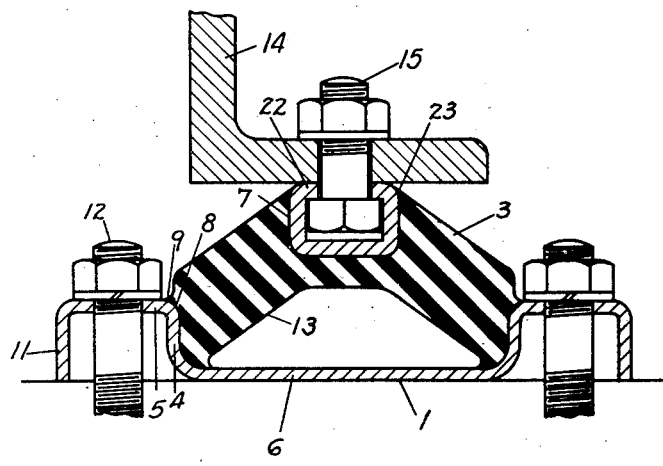
Figure 3:
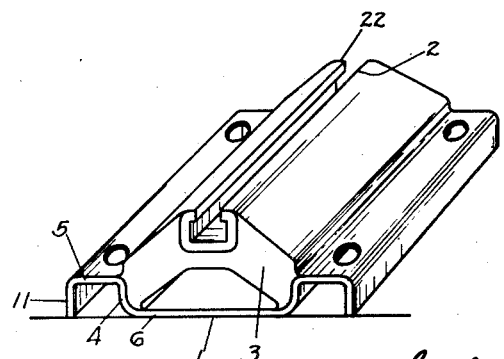

In the drawings, Fig. 1 is a section of a mounting embodying my invention; Fig. 2 is a section of a modification; Fig. 3 is a perspective of the Fig. 2 mounting; and Figs. 4 and 5 are sections of other modifications.

The mountings shown in the drawings are adapted for manufacture in strips of uniform cross section and lengths varying with the load to be supported, as indicated in Fig. 3. Each of the mountings comprises a strip 1 for attachment to a load supporting surface, a strip 2 for attachment to the load, and a rubber bridging member 3 forming a resilient connection between the strips.

In the mounting illustrated in Fig. 1, the strip for attachment to the load supporting surface which serves as the base plate of the mounting, is of channel section having spaced side walls 4 curved laterally outward at the outer ends and terminating in lateral extensions 5 parallel to the bottom wall 6 of the channel. The load attaching strip is a T-slot channel 7 arranged to receive and hold a bolt head for attachment to the load. The T-slot channel is imbedded in and bonded to the center of an arched rubber bridging member 3 having its outer ends bonded to the side walls 4 of the channel 1 and to the upper surface of the lateral extensions 5, and also to the bottom wall of the channel. The ends of the bridging member are seated on shoulders 8.

The mounting is made in a mold split or parted along the upper surface of the lateral extensions 5, one half of the mold having provisions for locating the T-slot channel and a cavity forming the outer contour of the rubber bridging member, and the other half of the mold receiving the base channel and a core forming the under side of the rubber bridging member. The mold parts close against the flat surface of the extensions 5 and at the closure shape the rubber to a feather edge 9 which insures a tight bond. The vertical stiffness of the mounting is controlled by the size of the mold core and the lateral stiffness of the mounting is controlled by the depth of the mold cavity. Since these are independently variable, a wide variation in mounting stiffnesses is obtainable. The mounting is attached to the load supporting surface by bolts 10 in the bottom wall 6.

In the modification shown in Fig. 2, the lateral extensions 5 are extended and formed to reversely presented channel sections 11 having lower edges in line with the bottom wall 6 of the channel. The extensions in use provide a box section which inherently has the desired rigidity for attachment to the load supporting surface. The walls 5 may be provided with suitably spaced bolt holes for bolts 12. The rubber bridging member 3 is provided with straight sides 13 which improve the shear action of the rubber and decrease set under load. The lateral softness of the mounting is increased by raising the outer contour of the bridging member above the top of the walls 4. The T-slot channel 7 is shown connected to a load 14 by means of a bolt 15.

In the modification of Fig. 4 the walls 4 of the base channel flare outwardly from the bottom wall 6 and at their outer ends are connected to angle sections 16 having walls 17 resting on the load supporting surface and provided with suitable bolt holes. The rubber bridging member 3 is provided with straight sides as in the Fig. 2 construction, but the outer surface has less projection above the walls 4 so the relative lateral stiffness is increased. The mold closure is against the rounded end 18 connecting the walls 4 with the angle sections 16. This is a less satisfactory mold closure since it is more difficult to obtain the feather edge 9 at the outer edge of the bond to the rubber bridging member.

In the form of the invention shown in Fig. 5, the base plate of the mounting is a flat strip 19 having bolt holes 20 at its outer edges and having the rubber bridging member 3 bonded to the upper surface of the base plate. To equalize the stress in the bond between the bridging member and the base plate, shoulders 21 are provided which distribute the stress. The shoulders 21 take the place of the rigid walls 4 in the previously described constructions.

In all of the mountings the molding operation is simplified by the fact that the mold closes against a flat or rounded metal surface on the base plate of the mounting in such a manner that variations in the dimensions of the base plate are not critical. By having the under side of the rubber bridging member continuous, the mold core construction is simplified and the core is easily removed. In all of the mountings, except that shown in Fig. 1, the attaching means are all readily accessible. This is important since the mountings may be used in cramped spaces. The T-slot channel holds the bolt head for attachment to the load and the bolts for attachment to the load supporting surface are at the outer side of the mountings. In the mounting shown in Fig. 1 the T-slot channel permits easy attachment to the load and the base channel may be bolted to the load supporting surface by bolts at the ends of the channel. The Fig. 1 construction is therefore adapted to use in shorter lengths than the other constructions. While the mountings may be molded in long lengths from which the desired shorter lengths may be cut, it is preferable that the mountings be molded to length since careless cutting may injure the rubber bond. When the rubber bond is injured, it has a tendency to peel. This tendency is reduced in the present invention by virtue of the minimizing of stress in the bond, particularly at the bond edges and also by having the rubber stressed partly in compression so that as load is applied to the bridging member the rubber is compressed against the bonded surfaces.

In all of the mountings, localized stress on the bond is prevented. In Figs. 1, 2 and 4, the ends of the bridging member are seated on load receiving shoulders 8 which relieve the stress on the bond. The feather edge 9 insures a tight bond at the upper edge where the tendency to peeling is greatest. The bridging member is also seated on the bottom wall of the base plate, relieving the bond stress at the lower ends. Similar mold closure surfaces 22 are provided by the inwardly extending walls of the T-slot channel 7. Feather edges 23 for the bonds prevent peeling. The stress on the bond to the channel 7 is decreased by extending the rubber beneath the bottom wall of the channel.

What I claim as new is:

1. In a mounting, a channel having a bottom wall for resting on a supporting surface and side walls extending away from the supporting surface with lateral extensions at the outer ends, a bridging member having rubber at its ends bonded to the side walls and arched away from the bottom wall, an attaching strip bonded to the center of the rubber member, and attaching provisions in the extensions.

2. In a mounting, a channel having a bottom wall for resting on a supporting surface and side walls extending away from the supporting surface with outer ends curved outwardly and merging into surfaces spaced from the bottom wall of the channel, a bridging member having rubber at its ends bonded to the side walls and having tapered sections merging into the surfaces, and attaching provisions on the channel and at the center of the bridging member.

3. In a mounting, a channel having a bottom wall for resting on a supporting surface and side walls extending away from the supporting surface with outer ends curved outwardly and merging into surfaces spaced from the bottom wall of the channel, a bridging member having rubber at its ends bonded to the side walls and having tapered sections merging into the surfaces, a T-slot channel bonded to the center of the bridging member for holding a bolt head, and attaching provisions on the channel.

4. In a mounting, a channel having a bottom wall for resting on a supporting surface and side walls extending away from the supporting surface with lateral extensions at the outer ends forming reversely presented channels, a bridging member having rubber at its ends bonded to the side walls, attaching provisions at the center of the bridging member, and attaching provisions in said reversely presented channels.

5. In a mounting, a channel having a bottom wall for resting on a supporting surface and side walls extending away from the supporting surface with lateral extensions at the outer ends forming reversely presented channels, a bridging member having rubber at its ends bonded to the side walls, a T-slot channel bonded in the center of the bridging member for holding a bolt head, and bolt holes in the reversely presented channels.

6. In a mounting, a strip having a central channel section and side angle sections extending laterally from the channel side walls, a bridging member having rubber at its ends bonded to the channel side walls, and attaching provisions at the center of the bridging member and in said angle sections.

7. In a mounting, a strip having a central channel section, side angle sections integrally connected with the upper edges of the channel side walls and having walls adjacent the channel side walls and laterally projecting walls for attachment to a supporting surface, a bridging member having rubber at its ends bonded to the channel side walls, and attaching provisions at the center of the bridging member.

8. In a mounting, a rubber bridging member, a T-slot channel having its side and bottom walls embedded in and bonded to the bridging member for holding a bolt head, and inwardly extending walls forming the stem of the T-slot connected to the side walls by rounded corners forming a feather edge in the bond to the channel side walls.

9. In a mounting, a rubber member, a socket member having side and bottom walls embedded and bonded in one face of the rubber member, a bolt having its head loosely and non-rotatably received in the socket member, said socket member enclosing the top of the bolt head, and inwardly extending walls on the side walls of the socket member forming an opening for the shank of the bolt and serving as clamping surfaces for the bolt head as the bolt is tightened.

10. In a mounting, a rubber member, a channel having side walls embedded and bonded in one face of the rubber member and adapted to slidably and non-rotatably receive a bolt head therebetween, a bottom wall on the channel bridging the lower edges of the channel side walls, and inwardly extending walls at the upper edges of the channel, side walls defining a slot for the shank of the bolt and serving as clamping surfaces for the bolt head as the bolt is tightened.

11. In a mounting, supporting and supported members, one of the members having spaced side walls with lateral outward extensions at the outer ends thereof providing load receiving shoulders at the junctions of the walls and extensions and the other member being between and spaced from said walls and extensions, and a bridging member of rubberlike material forming a load carrying connection between the supporting and supported members, said bridging member having ends seated on said shoulders and overlying and bonded to said walls and extensions and having portions between the walls and said other members free to yield partly in compression and predominately in shear, the construction being such that when load is applied to the bridging member the rubber is compressed against the load receiving walls and extensions.

GUSTAV H. KAEMMERLING.

REFERENCES CITED

The following references are of record in the file of this patent:

UNITED STATES PATENTS

| Number | Name | Date |
| --- | --- | --- |
| 2,132,840 | Workman et al. | Oct. 11, 1938 |
| 2,147,660 | Loewus | Feb. 21, 1939 |

FOREIGN PATENTS

| Number | Country | Date |
| --- | --- | --- |
| 110,316 | Australia | Apr. 4, 1940 |